(12) United States Patent
Wu et al.

(10) Patent No.: US 7,318,062 B2
(45) Date of Patent: Jan. 8, 2008

(54) STORING METHOD METADATA IN CODE

(75) Inventors: Gansha Wu, Beijing (CN); Guei-Yuan Lueh, San Jose, CA (US); Xiaohua Shi, Bejing (CN); Peng Guo, Beijing (CN)

(73) Assignee: Intel Corporation, Santa Clara, CA (US)

( * ) Notice: Subject to any disclaimer, the term of this patent is extended or adjusted under 35 U.S.C. 154(b) by 478 days.

(21) Appl. No.: 10/772,698

(22) Filed: Feb. 5, 2004

(65) Prior Publication Data
US 2005/0177596 A1 Aug. 11, 2005

(51) Int. Cl.
*G06F 17/30* (2006.01)
(52) U.S. Cl. ................ 707/100; 707/2; 707/3; 707/200; 707/202; 704/244
(58) Field of Classification Search .............. 707/2, 707/3, 200, 202; 704/244
See application file for complete search history.

(56) References Cited

U.S. PATENT DOCUMENTS

| 5,806,029 | A  | * | 9/1998 | Buhrke et al. ............. 704/244 |
| 6,317,869 | B1 | * | 11/2001 | Adl-Tabatabai et al. .... 717/132 |
| 6,671,707 | B1 |   | 12/2003 | Hudson et al. ............. 707/206 |
| 6,996,556 | B2 | * | 2/2006 | Boger et al. .................. 707/3 |
| 2004/0039729 | A1 | * | 2/2004 | Boger et al. .................. 707/2 |

OTHER PUBLICATIONS

Eirinaki et al, "Web Mining for Web Personalization", Feb. 2003, ACM Transactions on Internet Technology, vol. 3, No. 1, pp. 1-27.*

* cited by examiner

Primary Examiner—Jeffrey Gaffin
Assistant Examiner—Syed Farhan
(74) Attorney, Agent, or Firm—Trop, Pruner & Hu, P.C.

(57) ABSTRACT

In one embodiment, the present invention includes a method for storing a method bundle in code which may include method metadata and a cookie indicator to indicate the presence of method information. After such storage, a query may be performed to search for the method bundle around a queried instruction pointer.

14 Claims, 5 Drawing Sheets

STORING METHOD METADATA IN CODE

BACKGROUND

The present invention relates to programming systems and more particularly to query implementation.

In modern programming systems, it is a common task to query method metadata given a code address (or an instruction pointer (IP)). For instance, identifying a method handle for a specific frame during stack unwinding and locating method symbols by a sampling-based profiler are typical representative usages. The efficiency of query implementation is essential to system performance, especially for managed runtime environments (MRTEs), where the lookup time is part of runtime.

Conventional query implementation typically employs a data structure, such as a method lookup table, to save the starting and ending addresses of each method after a compiler generates its code. The data structure may be a linear sorted array or other structure that minimizes search time.

While this mechanism works well for traditional static or runtime environments on desktops and servers, problems exist in extending the mechanism to emerging mobile platforms such as cellular telephones and personal digital assistants (PDAs). These problems include a burden in terms of search and maintenance for small footprint systems, as the size of a method lookup table is proportional to the number of compiled methods; and runtime searching within the table is not as efficient in mobile systems as in desktop and server environments. Further, allocation and recycling of code in managed space introduces considerable complexity in maintaining [start address, end address] tuples. This is because the starting and ending addresses for a specific method may be changed or even invalidated if a garbage collector reclaims the method's code. Thus a need exists to store and query method metadata more efficiently, particularly in managed runtime environments.

DETAILED DESCRIPTION

In various embodiments of the present invention, method metadata may be stored directly within instruction code and thus later searching for the metadata may be limited to the local region of the queried IP. In certain embodiments, the method metadata may be a bundle that includes method information and a specific cookie. For example, the bundle may be of the form <cookie, method information>. The metadata may be stored in the method's compiled code, at the beginning or ending of the code, or at another location therein (as will be discussed in more detail below).

In certain embodiments, the cookie may be a magic cookie or cookie indicator that acts as an identifier indicating the beginning of authentic method information. As such, the cookie indicator acts as a transaction identifier. The magic cookie may be a word or several words of specific bit patterns which can be differentiated from other ordinary words within a memory range. For example, because the magic cookie is stored in code space, it may be differentiated from ordinary instruction code therein by assigning a bit pattern that is not compliant with the instruction set, i.e., an illegal instruction sequence. Thus in various embodiments, a magic cookie may be both architecture and compiler dependent, in that it may be an illegal instruction sequence of a given instruction set architecture (ISA), so that a piece of code will not be taken for the cookie. In addition, compilers may differentiate between code carried literals and the cookie.

In some embodiments, the method bundle may be stored at N-aligned addresses, where N is some power of 2 value, i.e., $N=2^x$ (where x is an integer). In such manner, a query may check for the existence of a method bundle only at N-aligned positions, rather than word by word.

Figure 1:
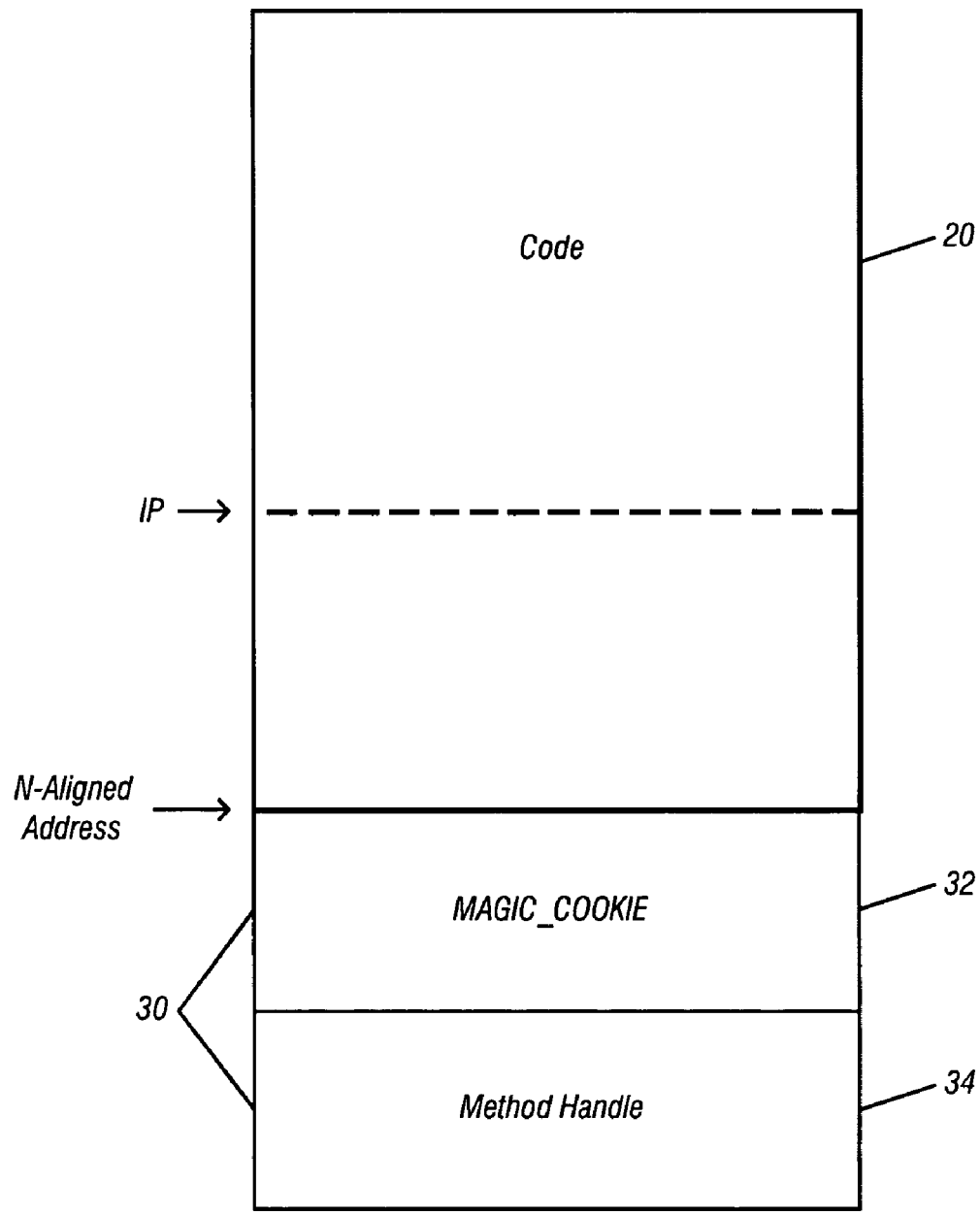
FIG. 1 is a block diagram of code layout of a code portion in accordance with one embodiment of the present invention.

Referring now to FIG. 1, shown is a block diagram of code layout of a code portion in accordance with one embodiment of the present invention. As shown in FIG. 1, code portion 10 includes code 20, which may be code corresponding to a certain method of a program. Included in code 20 is an address corresponding to the current value of the instruction pointer to be requested (represented in FIG. 1 as a dotted line at address IP). As further shown in FIG. 1, a method bundle 30 is saved at the end of code 20. Method bundle 30 includes a MAGIC_COOKIE 32 and a method handle 34. In various embodiments, MAGIC_COOKIE 32 may be a cookie indicator that indicates the presence of method information and may also be used as a pointer to point to the location of the method information. In various embodiments, method handle 34 may include the desired method information. As shown in FIG. 1, method bundle 30 may begin at an N-aligned address of code portion 10. In such manner, a searching process may be performed efficiently.

Referring to Table 1 below, shown is a source code implementation of a searching algorithm in accordance with one embodiment of the present invention.

TABLE 1

```
struct method_bundle {
  uint32 cookie;
  method_info* minfo;
};
method_info* query_method_info_by_IP(void* IP)
{
  if (!is_valid_code_address (IP))
    return NULL;
  method_bundle *mb = (method_bundle*) ALIGN(N, IP);
  while (mb->cookie != MAGIC_COOKIE) {
    /* goto the next N-aligned position */
    mb = (method_bundle *)((byte*)mb + N);
  }
  return mb->minfo;
}
```

As shown above, the source code begins by declaring data structures for the desired method bundle and method information. Next, the search method is initiated and is_valid_code_address (IP), a primitive supported by runtime systems, ensures that the IP is within the code space (otherwise searching for a MAGIC_COOKIE may be an impossible mission). In a typical runtime environment, code space may be allocated in a heap that is controlled by an automatic memory management system (e.g., a garbage collector or the like). In such an implementation, is_valid_code_address (IP) may check whether the queried IP is within the heap boundary.

If it is confirmed that the instruction pointer points to an address within the code portion, the query may begin by aligning the search to an N-aligned address of the code portion. The while loop of Table 1 illustrates one possible implementation of searching for a cookie indicator. In the while loop, if the address pointed to does not include a cookie indicator (i.e., MAGIC_COOKIE), the query strides to the next N-aligned position and the information therein is again checked to determine whether it is the cookie indicator. If it is, the method information (e.g., method handle 34) is returned to the requestor. If not, the next N-aligned address is queried.

In practice, the searching process may further be limited within some maximum striding steps if the system is aware of the maximum code size generated by the system so far. For example, an ahead-of-time (AOT) or a just-in-time (JIT) compiler may be aware of the code size of all compiled methods. Accordingly, a query implementation may be prevented from striding endlessly in search of a method bundle. That is, because the maximum code size for presently compiled methods may be known, a search algorithm may terminate striding through memory after a given number of strides. In other words, after a certain number of strides, a method bundle should be found if an instruction pointer points to a valid address in the code space. If an instruction pointer is not valid, terminating the query after a predetermined number of strides will prevent the query from entering an infinite loop or incautiously walking into unauthorized memory regions (which is a security risk).

Figure 2:
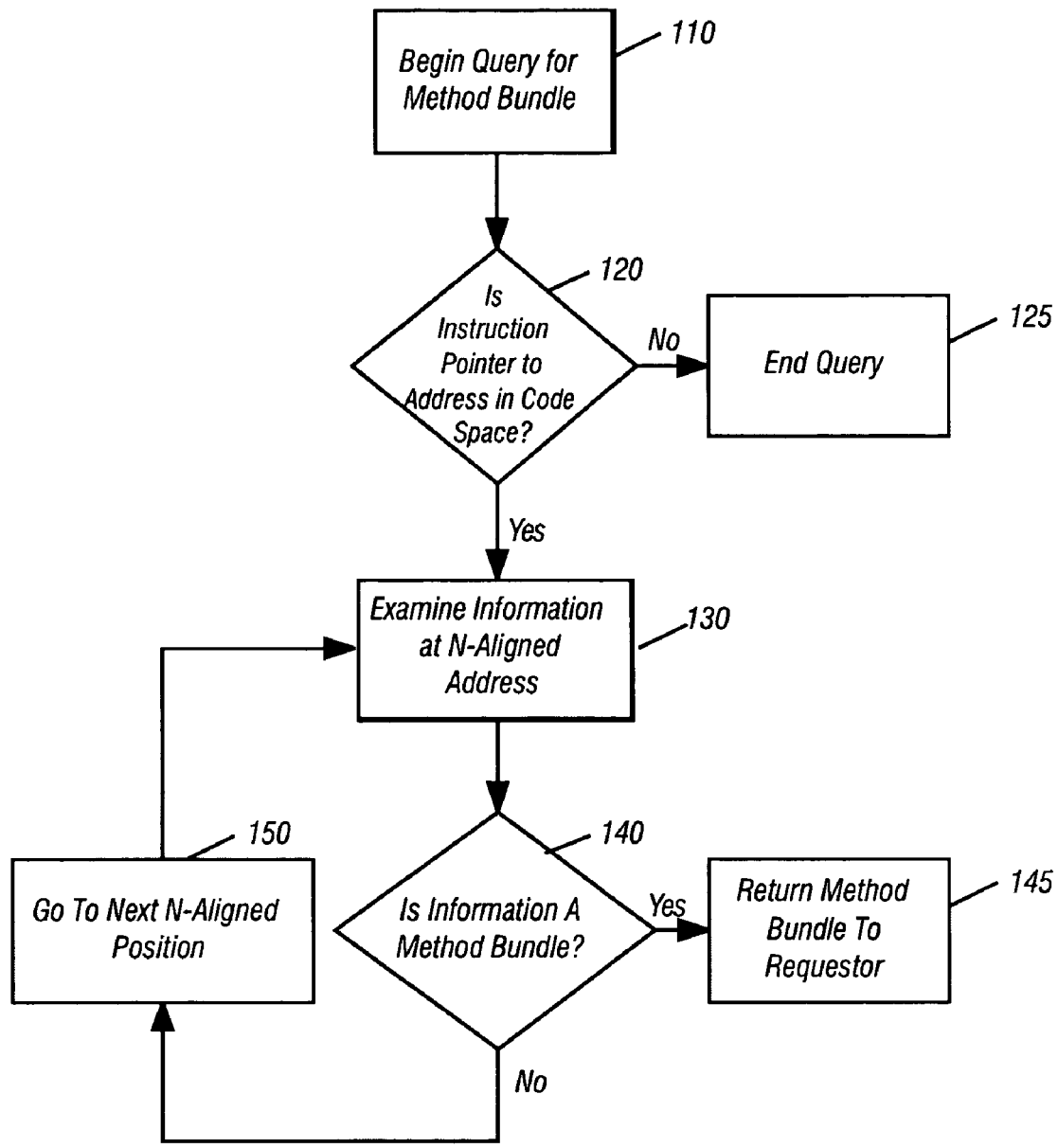
FIG. 2 is a flow diagram of a query implementation in accordance with one embodiment of the present invention.

Referring now to FIG. 2, shown is flow diagram of a query implementation method in accordance with one embodiment of the present invention. As shown in FIG. 2, method 100 begins by querying for a method bundle within a code portion (block 110). For example, a code portion corresponding to a given method may be queried for method information corresponding to the method. Next, it may be determined whether the instruction pointer is pointing to an address in the code space (diamond 120). If not, the query may be ended (block 125); otherwise the query may endlessly search for a nonexistent method bundle. Also, a NULL value may be returned to the requestor.

If the instruction pointer is pointing to a valid address in the code space, information at an N-aligned address may be examined (block 130). Specifically, the information at the given address may be examined to determine whether the information is a method bundle (diamond 140). In one embodiment, it may be determined whether the information at the N-aligned address is a cookie indicator, such as a magic cookie. If it is, this indicator indicates that a valid method bundle exists beginning at the N-aligned address. If so, the method bundle may be returned to the requestor (block 145). More specifically, in certain embodiments, the method information (which in the code portion of FIG. 1 is method handle 34) may be returned.

Alternately, if the information located at the given N-aligned address is not a method bundle, the query may continue by striding to the next N-aligned address position (block 150). Thereafter, a loop between block 130, diamond 140 and block 150 may continue until a valid method bundle is found and returned to the requestor at block 145.

Since the code where the cookie indicator is saved may only reside in an instruction cache (I-cache), searching for a magic cookie in code space may incur a data cache (D-cache) miss penalty. A careful selection of N may avoid excessive searching through code space and thus alleviate the miss penalty. The larger N is, the fewer penalties are incurred to stride through the code space. However, if N gets too large, there is wasted code space. For example, in certain implementations the code size for various methods may vary between several hundred bytes to hundreds of kilobytes (KB). In certain embodiments, N may equal four or five, such that every 16 or 32 bytes (e.g., every four or eight words) is queried for presence of a method bundle. However, in other embodiments, N may be larger or smaller than these values, given a desired implementation.

In a different implementation, a method bundle may be stored at a beginning part of a code portion. In such an implementation, to query for this method bundle, the source code of Table 1 may be modified by changing the striding direction via the following instruction:

$$mb=(method\_bundle*)((byte*)mb-N).$$

Thus the embodiment of FIG. 2 may be suitable for a computing environment where the average method code size is small (i.e., no excessive code-space striding). Because applications and workloads do not always satisfy this ideal requirement, other embodiments may adapt to more volatile application scenarios using lightweight compiler support.

A different embodiment may account for code-space striding cost, which results when a queried IP may be near the opposite side of a code portion from a saved method bundle. In such an embodiment, the method bundle may be saved in the middle of the code portion to minimize worst case searching cost. For example, compilers often emit code of basic blocks at N-aligned boundaries, e.g., to adopt better I-cache behavior. The alignment padding space between blocks may be used as a literal pool, and a method bundle may also be stored in this space in like manner.

More specifically, if a first basic block is identified in which to save a method bundle, the compiler may emit the code of a next (i.e., second) basic block at an N-aligned boundary, and store the method bundle at the opposite side of the boundary. As used herein, the term "next basic block" refers to the block that is physically adjacent to the previous block.

Figure 3:
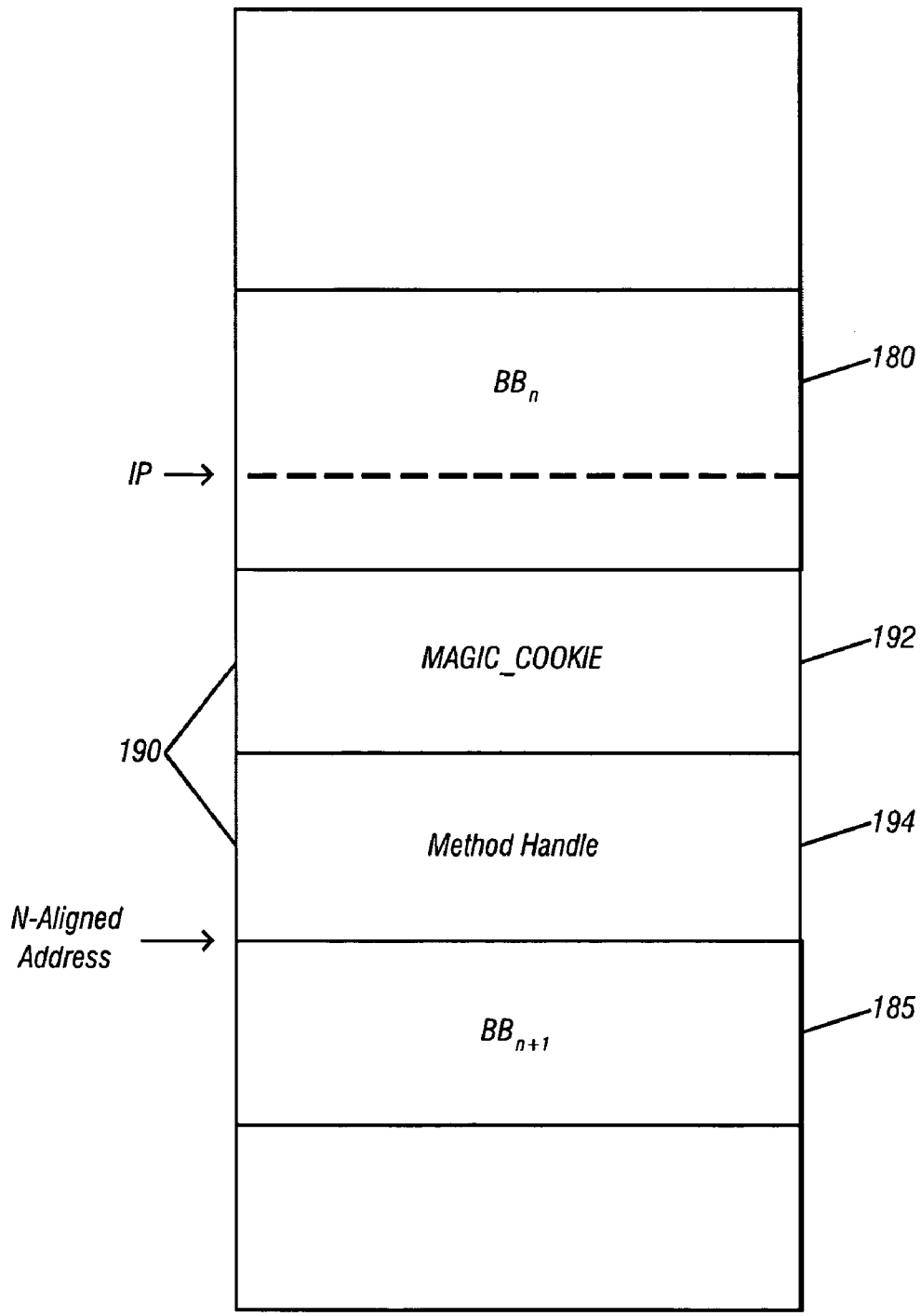
FIG. 3 is a block diagram of code layout of a code portion in accordance with another embodiment of the present invention.

Referring now to FIG. 3, shown is a block diagram of code layout of a code portion in accordance with this embodiment of the present invention. As shown in FIG. 3, code portion 175 includes a first basic block ($BB_n$) 180 and a second basic block ($BB_{n+1}$) 185. Shown further in FIG. 3, located between first basic block 180 and second basic block 185 is a method bundle 190 that includes MAGIC_COOKIE 192 and a method handle 194.

As shown in FIG. 3, $BB_n$ 180 is assigned to accommodate method bundle 190, thus the compiler emits the code for $BB_{n+1}$ 185 at the next N-aligned address and stores method bundle 190 immediately prior to $BB_{n+1}$ 185. As a result, a query implementation for the code portion of FIG. 3 may differ from that of Table 1.

Shown below in Table 2 is a source code implementation of a searching algorithm in accordance with a second embodiment of the present invention.

TABLE 2

```
method_info* query_method_info_by_IP(void* IP)
{
  if (!is_valid_code_address (IP))
    return NULL;
  method_bundle *mb = (method_bundle*)
    ( ALIGN(N, IP) - sizeof(method_bundle) );
  while (mb->cookie != MAGIC_COOKIE) {
    /* goto the next N-aligned position */
    mb = (method_bundle *)((byte*)mb + N -
sizeof(method_bundle));
  }
  return mb->minfo;
}
```

The searching algorithm of Table 2 performs similarly to that discussed above with regard to Table 1, except with respect to the location of searching for a method bundle. Specifically, the boldfaced portions in Table 2 indicate that the method bundle is searched for before an N-aligned boundary, not after an N-aligned position, as depicted in the original code layout of Table 1. In other respects, the source code of Table 2 operates similarly to that of Table 1. In certain embodiments in which a method bundle is stored in alignment padding space, the memory striding process may ensure that the method bundle is found prior to reaching a literal pool also stored in the alignment padding space.

Figure 4:
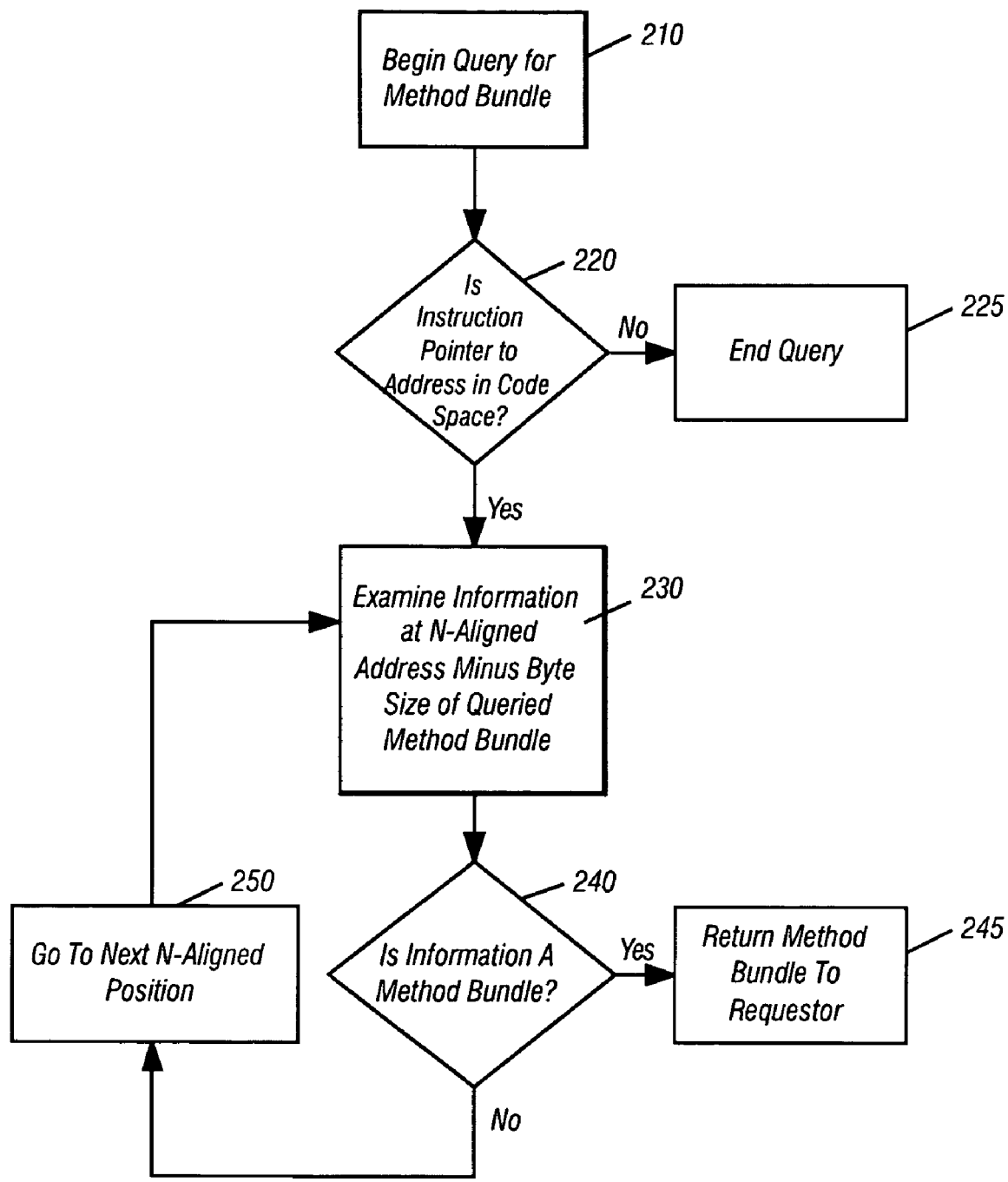
FIG. 4 is a flow diagram of a query implementation in accordance with a second embodiment of the present invention.

Referring now to FIG. 4, shown is a flow diagram of a query implementation in accordance with this second embodiment of the present invention. As shown in FIG. 4, method 200 begins by querying for a method bundle within a code portion (block 210). Next, it may be determined whether the instruction pointer is pointing to an address in the code space (diamond 220). If not, the query may be ended (block 225). Also, a NULL may be returned to the requestor.

If the instruction pointer is pointing to a valid address in the code space, information at an address corresponding to an N-aligned address minus a size of the method bundle may be examined (block 230) to determine whether the information is a method bundle (diamond 240). If the information is a method bundle, it may be returned to the requestor (block 245).

Alternately, if the information located at the given address is not a method bundle, the query may continue by striding to the next corresponding N-aligned address position (block 250). Thereafter, a loop between block 230, diamond 240 and block 250 may continue until a valid method bundle is found and returned to the requestor at block 245.

In such manner, a query searching process may be reduced from a whole-method scope to a basic block scope, resulting in considerable performance improvement. In certain such embodiments, a copy of the method bundle may be stored at the end of the code portion to guarantee that the searching process finally converges.

In other implementations, flexible strategies may be used to select a mid-code basic block $BB_n$ in which to place method bundle. For example, a maximum searching length $SL_M$ may be set, and when the size of already emitted basic blocks exceeds $SL_M$, a copy of the method bundle may be saved at the end of current basic block. In such manner, the worst case searching length is bounded.

Alternately, a compiler may statically select those basic blocks that may contain one or some IPs tending to be queried frequently. For instance, the compiler can infer whether a call site may throw an exception, based on context information like whether the call is a type test that may fail, or whether the called method is claimed to throw an exception (e.g., a method includes a JAVA™ throws clause in the method declaration), or whether the call site is enclosed by a try-catch statement protected block, and the like. Then the compiler may speculatively assume that the IP of the call site is very likely to be queried for method information when a stack trace is constructed during exception throwing, and save the method bundle in the enclosing basic block.

In various embodiments, the compiler may make storage decisions based on static or dynamic profiling. In other embodiments, a combination of some of the above strategies may be implemented. Yet in other embodiments, the compiler may store the method bundle at the end of each basic block, which guarantees the searching will end in one basic block's scope, at the cost of some space waste (i.e., the N-alignment padding space for each basic block).

Other embodiments may be implemented according to specific contexts of querying. For example, certain special-purpose functions are only invoked inside a method's prologue and/or epilogue and inside these functions, caller method information is queried. By adaptively storing a method bundle at the beginning and/or ending of the code, the searching process may finish within one or several steps through backwards-only or forwards-only (or even bi-directional) striding when it cannot be determined whether the call site resides in the prologue or in the epilogue.

Thus in various embodiments, searching for cookie-indicated method information inside compiled code may be performed. Searching performance in accordance with an embodiment of the present invention may be improved using lightweight support from compilers. Embodiments may be suitable for different runtime systems, especially a mobile execution environment such as a cellular telephone, PDA, and the like. In such manner, method code may be moved or recycled without affecting stored method metadata.

While embodiments may be implemented in various manners, certain embodiments may be implemented in connection with a JIT compiler for JAVA™ bytecodes and Microsoft Corporation's Common Language Interface (CLI) bytecodes. In such manner, various systems implementing virtual machines may more efficiently store and query method metadata.

Embodiments of the present invention may be implemented in code and may be stored on a storage medium having stored thereon instructions which can be used to program a system, such as a mobile system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), flash memories, electrically erasable programmable read-only memories (EEPROMs), magnetic or optical cards, a silicon-oxide-nitride-oxide-silicon (SONOS) memory, a phase-change or ferroelectric memory, or any type of media suitable for storing electronic instructions.

Figure 5:
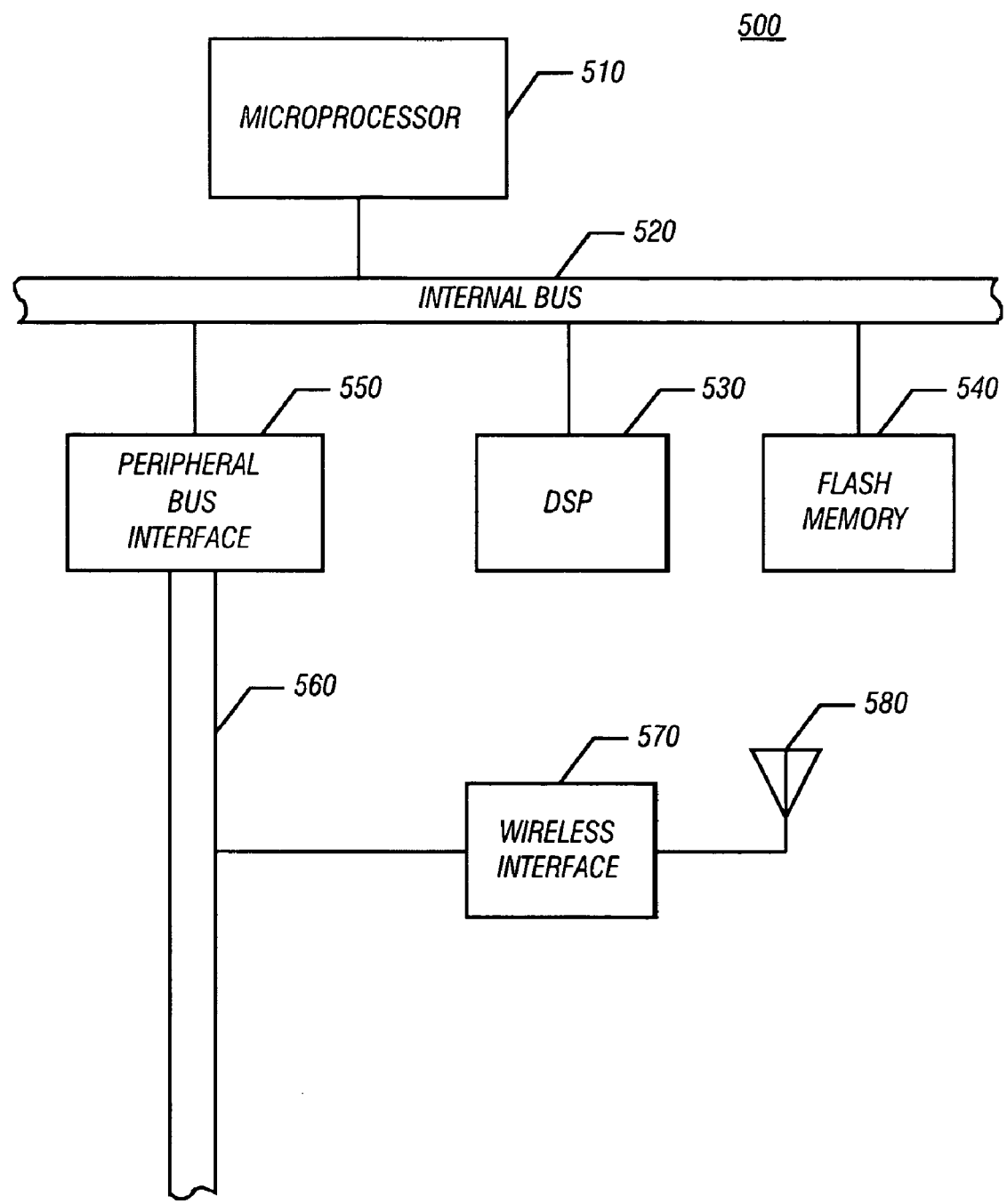
FIG. 5 is a block diagram of a system in accordance with one embodiment of the present invention.

FIG. 5 is a block diagram of a mobile system with which embodiments of the invention may be used. As shown in FIG. 5, in one embodiment mobile system 500 includes a processor 510, which may include a general-purpose or special-purpose processor such as a microprocessor, microcontroller, application specific integrated circuit (ASIC), a programmable gate array (PGA), and the like. Processor 510 may be coupled to a digital signal processor (DSP) 530 via an internal bus 520. A flash memory 540 which may store query implementations and method metadata in accordance with an embodiment of the present invention also may be coupled to internal bus 520.

As shown in FIG. 5, microprocessor 510 may also be coupled to a peripheral bus interface 550 and a peripheral bus 560. While many devices may be coupled to peripheral bus 560, shown in FIG. 5 is a wireless interface 570 which is in turn coupled to an antenna 580. In various embodiments antenna 580 may be a dipole antenna, helical antenna, a global system for mobile communications (GSM) antenna or another such antenna.

Although the description makes reference to specific components of system 500, it is contemplated that numerous modifications and variations of the described and illustrated embodiments may be possible. More so, while FIG. 5 shows a block diagram of a mobile system, it is to be understood that embodiments of the present invention may be implemented in a system such as a personal computer, server, or the like.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

locating compiled instruction code in an instruction cache of a mobile platform device, the instruction code including a first N-aligned address, a second N-aligned address located immediately after the first N-aligned address, and a third N-aligned address located immediately after the second N-aligned address; wherein $N=2^x$ and x is an integer;

storing metadata at one of a first location, a second location, or a third location; the first location being based on the first N-aligned address, the second location being based on the second N-aligned address, the third location being based on the third N-aligned address, wherein the metadata comprises a bundle that includes a cookie and method information, the bundle having a first bundle size and the cookie having a bit pattern non-compliant with an instruction set architecture;

confirming an instruction pointer points to a valid address included in the instruction code;

searching for the metadata at the first location;

if the metadata is still not located, searching for the metadata at the second location; and if the metadata is still not located, searching for the metadata at the third location;

wherein, to expedite the searching process, searching for the metadata is limited to searching only in the instruction cache.

2. The method of claim 1, wherein the metadata further comprises a method handle.

3. The method of claim 1, further comprising storing the metadata at an end of the instruction code.

4. The method of claim 1, further comprising querying the instruction code for the metadata using a maximum number of strides based on a maximum code size.

5. The method of claim 1, further comprising storing the metadata between a first basic block and a second basic block of the instruction code.

6. The method of claim 1, further comprising using a compiler to store the metadata in the instruction code.

7. The method of claim 6, further comprising storing the metadata in a basic block used for exception handling.

8. The method of claim 1, further comprising searching for the metadata at the first location; wherein the first location is located immediately prior to the first N-aligned address.

9. The method of claim 8, further comprising searching for the metadata at the first location wherein the first location is located a first distance behind the first N-aligned address and the first distance is equal to the first bundle size.

10. The method of claim 1, further comprising searching for the metadata at the first location; wherein the first location is located immediately after to the first N-aligned address.

11. The method of claim 1, further comprising searching for the metadata in an alignment padding space located between a first block and a second black, the alignment padding space including the first location and a literal pool.

12. The method of claim 1, further comprising confirming, via a compiler, that a first block will be queried frequently and storing the metadata in the first block.

13. An article comprising a machine-accessible storage medium containing instructions that when executed enable a system to:

store method metadata, which includes a cookie having a bit pattern non-compliant with an instruction set architecture, at one of a first location, a second location, or a third location of instruction code to be located in an instruction cache of a mobile platform device, the instruction code portion to be later searched for the method metadata based on the first location and, if the metadata is not located, based on the second location and, if the metadata is still not located, based on the third location;

wherein the instruction code includes a first N-aligned address upon which the first location is based, a second N-aligned address, which is located after the first N-aligned address and upon which the second location is based, and a third N-aligned address, which is located after the second N-aligned address and upon which the third location is based, and where $N=2^x$ and x is an integer.

14. The article of claim 13, further comprising further comprising instructions that when executed enable the system to store the method metadata between a first basic block and a second basic block of the code portion.

* * * * *

UNITED STATES PATENT AND TRADEMARK OFFICE
CERTIFICATE OF CORRECTION

PATENT NO. : 7,318,062 B2  Page 1 of 1
APPLICATION NO. : 10/772698
DATED : January 8, 2008
INVENTOR(S) : Gansha Wu et al.

It is certified that error appears in the above-identified patent and that said Letters Patent is hereby corrected as shown below:

Column 8:
Lines 53 and 54, "further comprising further comprising" should be --further comprising--.

Signed and Sealed this

Thirteenth Day of May, 2008

JON W. DUDAS
*Director of the United States Patent and Trademark Office*